(12) United States Patent  
Jäger

(10) Patent No.: US 6,520,312 B2  
(45) Date of Patent: Feb. 18, 2003

(54) INTERLINKED PRODUCTION SYSTEM

(75) Inventor: Helmut F. Jäger, Königsbach-Stein (DE)

(73) Assignee: Felsomat GmbH & Co. KG, Konigsbach-Stein (DE)

( * ) Notice: Subject to any disclaimer, the term of this patent is extended or adjusted under 35 U.S.C. 154(b) by 108 days.

(21) Appl. No.: 09/784,974

(22) Filed: Feb. 15, 2001

(65) Prior Publication Data

US 2001/0022932 A1 Sep. 20, 2001

(30) Foreign Application Priority Data

Feb. 16, 2000 (DE) ........................................ 100 07 024  
Jul. 31, 2000 (EP) ............................................. 00116129

(51) Int. Cl.⁷ ............................................. B65G 37/00
(52) U.S. Cl. .................................. 198/346.1; 198/347.1
(58) Field of Search ........................... 198/347.1, 347.6, 198/346.1, 465.1, 867.01, 867.14

(56) References Cited

U.S. PATENT DOCUMENTS

| | | | |
|---|---|---|---|
| 3,893,575 A | 7/1975 | Pearne et al. ................. 214/8.5 |
| 3,914,154 A | 10/1975 | Pfeiffer ........................ 156/557 |
| 4,541,762 A | 9/1985 | Tischler et al. ................ 414/32 |
| 4,588,341 A | 5/1986 | Motoda ........................ 414/32 |
| 4,978,275 A | 12/1990 | Reid et al. ................ 414/789.5 |
| 5,232,081 A | * 8/1993 | Kanamori ............ 198/347.1 X |
| 5,271,139 A | * 12/1993 | Sticht ................. 198/346.1 X |
| 5,441,146 A | * 8/1995 | Ziegler ................ 198/347.2 X |
| 5,498,122 A | 3/1996 | Miura et al. ................. 414/786 |
| 5,536,137 A | 7/1996 | Jäger ........................ 414/788.7 |
| 5,807,055 A | * 9/1998 | Van de Hazel ...... 198/347.1 X |
| 5,882,174 A | 3/1999 | Woerner et al. ......... 414/788.7 |
| 6,227,347 B1 | * 5/2001 | Bryant et al. ........ 198/347.1 X |
| 6,340,282 B1 | 1/2002 | Bär et al. ................. 414/788.7 |

FOREIGN PATENT DOCUMENTS

| | | | | |
|---|---|---|---|---|
| DE | 19805206 A1 | 8/1999 | ........... B65G/61/00 |
| EP | 0673711 A1 | 12/1994 | ........... B23Q/11/08 |
| EP | 0865869 A1 | 12/1997 | ........... B23Q/37/00 |
| GB | 2 087 846 A | 6/1982 | ........... B65H/43/00 |

* cited by examiner

*Primary Examiner*—James R. Bidwell  
(74) *Attorney, Agent, or Firm*—Henneman & Saunders; Larry E. Henneman, Jr.

(57) ABSTRACT

An interlinked production system is provided with a plurality of processing stations, at least three buffers being provided for decoupling the processing steps in the different processing stations. The flow of parts through the individual stations and the buffers is provided by at least one portal or several portals, upon which a plurality of portal grippers can be driven. The portal grippers are configured for transferring the parts to be processed between the processing stations and the buffers and for loading and unloading of parts. The buffers are configured to receive part carriers and each comprises at least two stack positions. A transfer device is provided for transferring part carriers between the stack positions within the buffers. In this manner, a very flexible interlinked production system is achieved, which can be adjusted to operate in one-piece-flow or also for an optimal productivity with optimised buffer capacities.

19 Claims, 4 Drawing Sheets

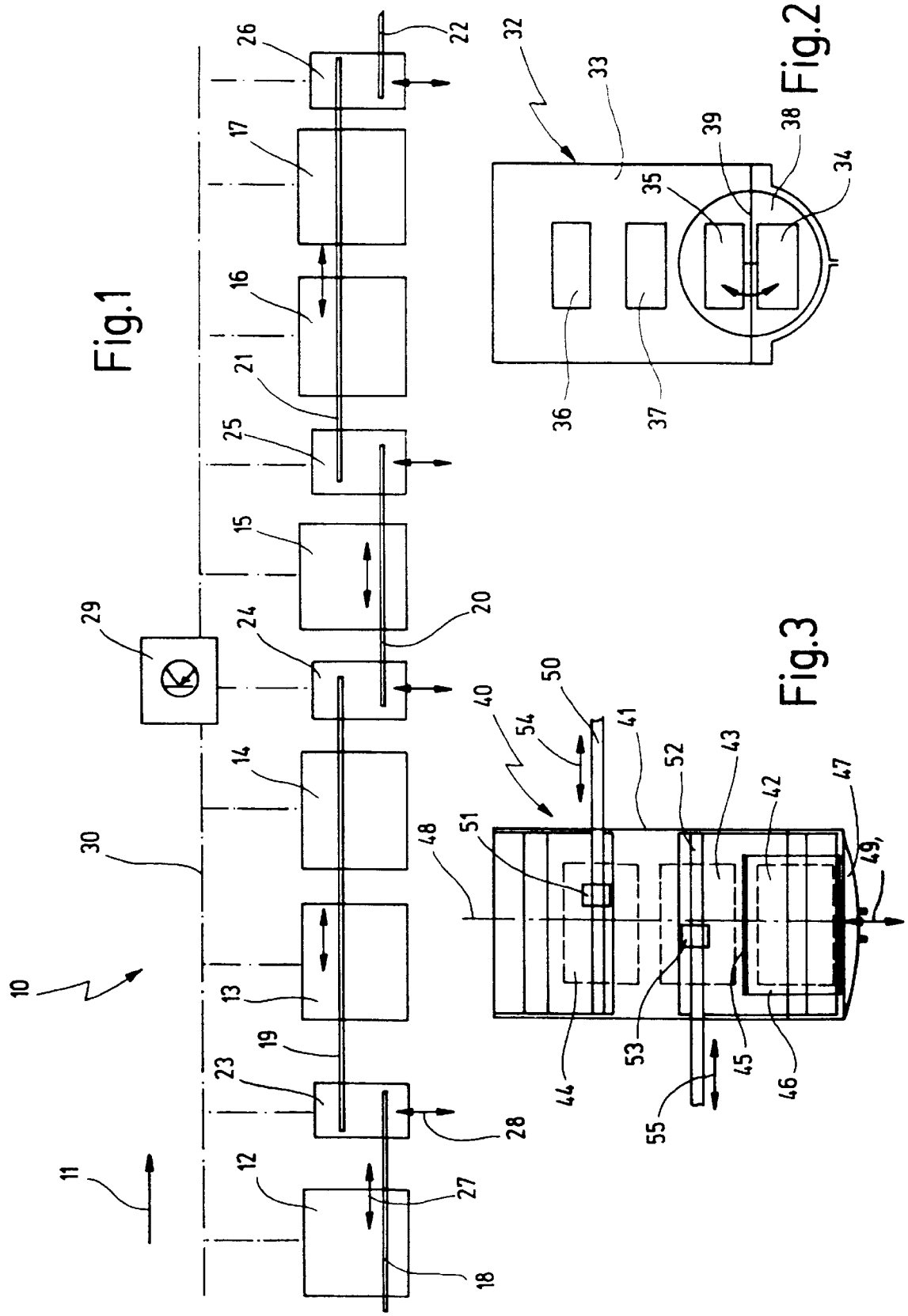

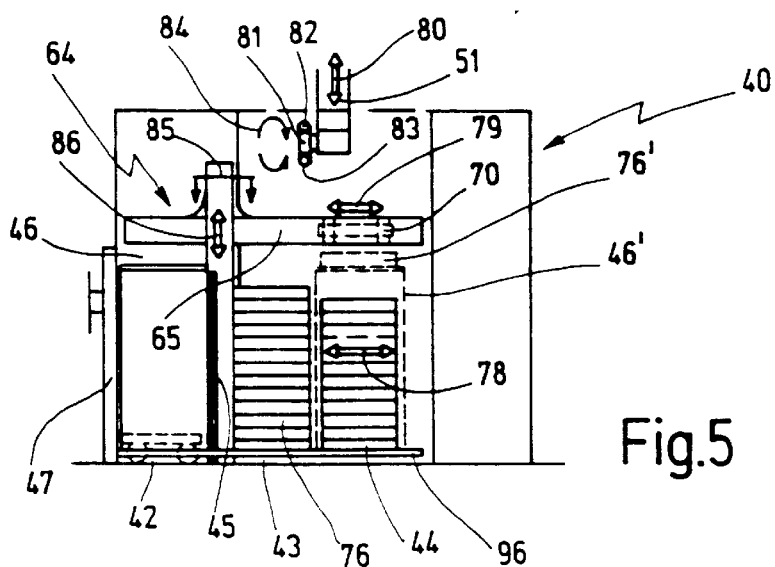
Fig. 5
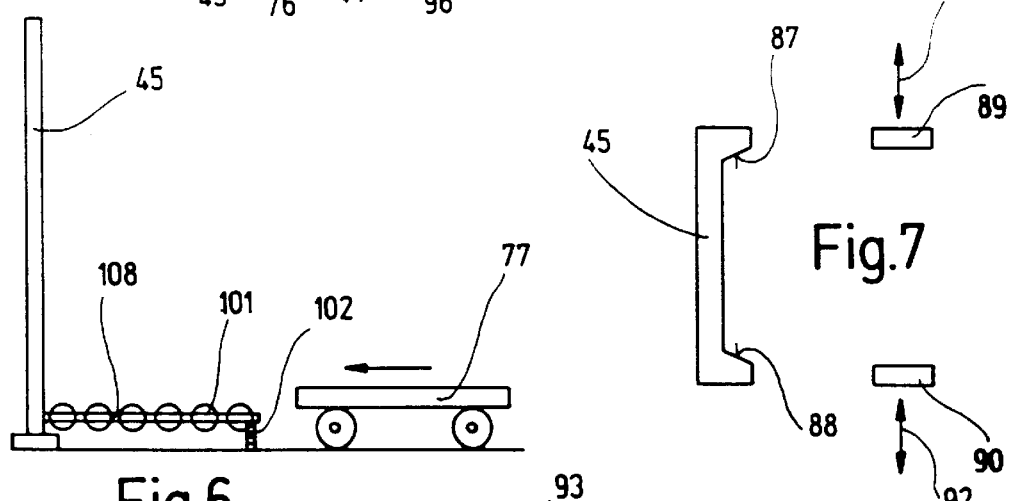
Fig. 6
Fig. 7
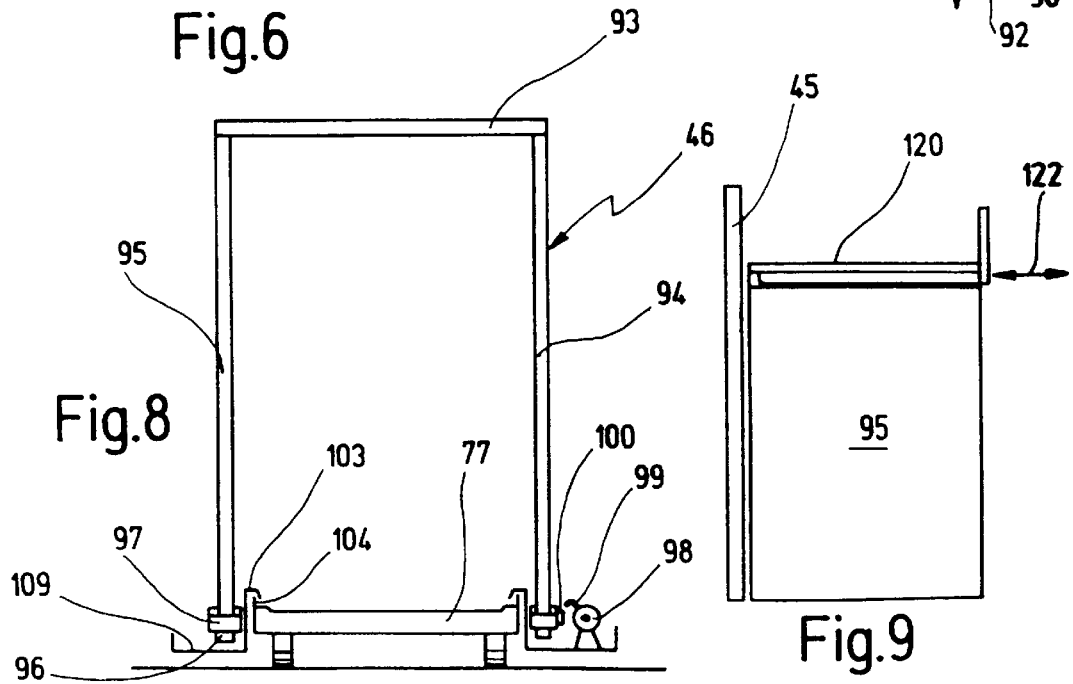
Fig. 8
Fig. 9

INTERLINKED PRODUCTION SYSTEM

FOREIGN PRIORITY

This application claims the right of foreign priority to German Application No. 100 07 024.8 filed on Feb. 16, 2000, and to European Application No. 00 116 129.8 filed on Jul. 31, 2000, and both applications are incorporated herein by reference in their entirety.

BACKGROUND OF THE INVENTION

Interlinked production systems are used in mass production to be able to process workpieces in the most inexpensive and reliable manner in a number of processing stations. Typical applications for interlinked production systems are found in the automobile industry, for example for the highly efficient fabrication of motor and transmission components.

The line production is known as a classical example of an interlinked production system, in which the flow of parts between the individual processing stations is controlled over a belt, which serves as a buffer at the same time. Portals branch off to the side from the belt to the individual processing stations.

The coupling of a plurality of processing stations via portals is known as a further example of an interlinked production system, where belt buffer stores are arranged between the individual or several processing stations for decoupling. Such belt buffer stores are conveyor belts with which individual parts are conveyed or stored. Such buffers normally receive about 10 to 20 parts and can make up for certain fluctuations caused by delays at the associated processing stations.

However, a drawback is that the belt buffer stores are only designed for a small number of parts, so that when larger disruptions occur at one or more processing stations of the processing system, the entire system shuts down in short time. In addition, the handling of individual parts can have negative effects on their quality, because damage may occur. Furthermore, when emptying one of the buffers, one must first wait until all of the parts have been used up. This is a problem when a so-called one-piece-flow operation is important, i.e. when the processing steps are to be controlled so that one part passes through the various processing stations in sequence without being stored intermediately as far as possible. With a one-piece-flow operation, short throughput times are basically achievable, however, the productivity of the production system is reduced because the smallest machine idle time can lead to so-called linkage losses.

A one-piece-flow operation is practically impossible with the above-mentioned conveyor belt, through which the individual processing stations can be connected and coupled to one another through portals.

The use of a belt as conveying means and at the same time the use of buffering between the individual processing stations does allow a certain buffering with differing outputs of the individually coupled stations, however, the entire system cannot be designed for high productivity and short throughput times. The different cycle times of the individual stations necessarily negatively effect the output of the entire system.

Furthermore, the information flow associated with the individual parts is very difficult to control. This is especially a problem when the quality of the individual parts is to be fully documented.

When changing the two mentioned production systems to produce different parts, the entire system must at first be emptied before the fabrication of the other parts can begin. It is also basically known to couple so-called automated cells to one or more processing stations. A number of carriers for stacks of parts are contained in the cells which serve as buffers. With the coupled automated cells, the stations are supplied with fresh parts independent of the processing fluctuations and finished parts are received therein (see for example EP 0 673 711 A1 or EP 0 865 869 A1).

The coupling of all processing stations of the entire production system, for example having 20 or 30 stations, takes place from outerlying intermediate stores which are arranged between automated cells of the associated processing stations. Stacks of workpieces are transported by roller carts or wagons between these intermediate stores and the automated cells.

The higher requirement for storage and parts inventory for the entire system has proven to be a disadvantage. In addition, human intervention is required at the predetermined cycle intervals to promptly transport the stack of part carriers between the intermediate stores and the automated cells. This basic dependency on manual operations is considered to be at least partially disadvantageous in automated production systems.

It is also basically known to automatically couple different processing stations of an interlinked production system and the intermediately arranged buffers through transportation systems without a driver. The high investment and the complicated control and software for the total system has proven to be a disadvantage, where at the same time, an increased danger of accidents can occur. Furthermore, the reliability up until now has largely not been sufficient.

SUMMARY OF THE INVENTION

It is an object of the present invention to provide an improved interlinked production system which allowes a flexible control of the flow of the parts processed therein, even through a large system with several processing stations.

It is a further object of the present invention to provide an improved interlinked production system suitable for a one-piece-flow operation on the one hand and allowing operation using buffers for higher productivity on the other hand.

It is a further object of the present invention to provide an improved interlinked production system being as inexpensive as possible and flexible at the same time.

It is still another object of the present invention to provide an improved interlinked production system having a high reliability.

It is another object of the present invention to provide an improved interlinked production system requiring only a very limited space.

These and other objects of the present invention are achieved with an interlinked production system of the above-mentioned type, where in at least three buffers are provided, the buffers being configured to receive part carriers and having at least two stack positions, a transfer device being provided for transferring part carriers between the stack positions within the buffer. The object of the invention is completely achieved in this manner.

According to the present invention, the transportation of parts through the interlinked production system is ensured with the aid of one or more portals with portal grippers which are drivable thereon. The production system, which has at least three buffers, preferably however a plurality of buffers in communication with a corresponding number of processing stations, is flexibly interlinked through the buffers, which are configured to receive part carriers, whereby the disadvantages of belt stores are avoided. The capacity of the buffers can be adapted to the individual requirements and also to the given condition of the total system by the transfer device for transferring the part carriers between the stack positions within the buffer.

Human intervention is not necessary in the system for transporting the stacks of workpiece carriers. Rather, operating personnel is only necessary for the purposes of control and monitoring and for emergencies.

It is also possible, if desired to introduce additional part carriers into the buffers from the outside or to remove same. In this manner, an extremely flexible operation for the entire production system is made possible.

A one-piece-flow can be achieved in that the buffer capacity is not utilised or is minimised. Minimal throughput times and minimal stores can be achieved.

In another strategy, certain minimum capacities can be set for the buffers to achieve the highest possible productivity. At the same time it is possible to use specially configured buffers at various locations in the total system to account for differing machine cycle times, shorter machine idle times and even to account for changes in the production system. It is even possible to simulate the behaviour of the production system with the aid of a simulation and to determine optimal buffer capacities for the highest possible productivity, which are then used as set values in the individual buffers. Differing cycle times and the probability of failure of the individual components of the production system can be accounted for, to thereby optimise the total flow.

Furthermore, it is possible in emergencies to supply additional part carriers into the buffers or remove carriers therefrom through the outerlying transportation means without extensive use of personnel. The buffers can also be automatically loaded and unloaded according to the FIFO principle (first in/first out), which can generally take place in flexible manner or in predetermined time intervals.

A particular advantage of the system is also a decentralised administration of data, where the information concerning the individual parts, the part carriers or stacks of part carriers in the total system can be properly processed and monitored. The workpieces flow through the total system practically together with the associated information, and an extremely transparent flow of material and information results. Thus a transparency of the entire production flow results with an overview of the utilisation of the machines and the capacity of the buffers.

In a first embodiment of the present production system, at least one transfer device is formed by a portal gripper, which is configured to grip the parts and also to transfer the part carriers, where the stack positions of the buffer are arranged sequentially in the drive direction of the gripper along the portal.

This provides a particularly inexpensive and realisable solution because the buffers are very simply constructed and do not require their own transfer means. Moreover, the transfer takes place with the aid of grippers, which are used both for transferring part carriers and also for handling the parts, to introduce or to remove these from the processing stations and for loading these into the part carriers in the buffers and for unloading them. This particularly inexpensive configuration is offset by limited flexibility because a manual supply and discharge of additional part carriers in the buffers is no longer possible independently from the function of the remaining system. In addition, the various grippers can hinder one another. Idle times can also arise because the grippers cannot perform restacking within the buffer during supply to a processing station. Even so, this simplified configuration is sufficient for some systems due to its cost advantages.

According to another embodiment of the present invention, at least one of the buffers is configured as an automated cell having its own transfer device for transferring part carriers within the automated cell. In this manner, the above described disadvantages are avoided because restacking within the buffer becomes independent of the supply of parts to the processing stations.

The automated cells are preferably arranged such that the stack positions in the automated cells are located transversely to the extension direction of the at least one portal. In this manner, narrow automated cells can be arranged between adjacent processing stations to reduce the space requirement of the total system.

In a further embodiment of the present invention, at least one buffer is configured as an automated cell having a transfer device for transferring part carriers between different stack positions within a working space of the automated cell and having means for supplying and discharging stacks of part carriers into the working space and out of the working space.

In this manner, restacking and handling within the working space of the automated cell is decoupled from the supply or removal of workpiece carriers in a loading space. The automatic operations within the working space of the cell can be continued simultaneously with the supply and removal, where the necessary safety precautions are maintained by closing off the loading space when the outer door is open. For this purpose, each of the automated cells preferably comprises at least three stack positions.

In a further embodiment of the present invention, at least one of the buffers is coupled to the processing stations through at least two portals. In this manner, parts from a previous processing station can be transferred to a respective automated cell and parts can be transferred out of the automated cell into a subsequent processing station, without gripping means or the like within the automated cell hindering one another. Basically however, it would also be possible to provide only a single portal for connecting all of the processing stations and automated cells or buffers.

In a further embodiment of the present invention, the buffers are at least partially configured as automated cells, whereby a first, a second and a third stack position is arranged sequentially in a horizontal direction within the working space, which is closed to the top. The first stack position can be loaded through a door from the outside in horizontal direction and can be separated to avoid contact with the remaining stack positions. A transfer device extends in the direction of the sequentially arranged stack positions and allows a transfer of the parts between the three stack positions within the working space. The transfer device includes a first linear axis drivable in horizontal direction and a second linear axis drivable in vertical direction.

A sufficiently large buffer capacity can be realised for short cycle times of an associated processing station by using such an automated cell with low space requirements and relatively low costs. A transfer of part carriers between the individual stack positions as well as the readying of the part carriers for the associated gripper, which is drivable on a portal running thereabove, is achieved with a single transfer device. An additional loading unit, such as a stack changer module, is not necessary.

With this special strategy for transferring the part carriers between the individual stack positions, a more rapid working flow and a good adaptation to the associated stations can be realised with very short cycle times.

In a further embodiment, the first stack location is separated from the second neighbouring stack location through a substantially vertical bulkhead and is separated by a hood from the remaining portion of the working space to avoid contact, which is drivable at least between the first and second stack positions. The bulkhead can be configured to be stationary and provided with centering surfaces for guiding and centering part carriers supplied to the first stack position. In addition, the bulkhead can have associated guide elements which are arranged to engage the sides of the part carriers for centering the supplied part carriers.

The hood is preferably U-shaped and configured with a cover surface and two side surfaces. In addition, the hood is preferably provided to be drivable between the first, the second and the third stack positions. With these features, the handling within the working space can be decoupled from the supply or removal of part carriers from the first stack position. Furthermore, the automated cell can be designed for shorter cycle times.

The hood can be driven by means of the transfer device. However, an separate drive can be provided for the hood to achieve even shorter cycle times. The hood can also be configured to receive at least one part carrier, if an associated processing station has an especially short cycle time. For this purpose, the portal gripper at the third stack position can access the part carrier placed on the hood, while at the same time, a restacking between part carriers is possible at the first and second stack positions.

Finally, a drawer for receiving a part carrier is provided on the upper side of the hood, which allows a part carrier to be driven to the outside when the loading door is opened. This enables the supply and discharge of test parts and in addition an operation of the cell or the entire system only with individual part carriers placed in the hood and independently from the capacity of the buffers or automated cells. It is possible for example to briefly introduce a small series production into the work flow.

It will be understood that the above-mentioned features and those to be discussed below are not only applicable in the given combinations, but may also be used in other combinations or taken alone without departing from the scope of the invention.

BRIEF DESCRIPTION OF THE DRAWINGS

Further features and advantages of the invention can be taken from the following description of preferred embodiments taken in conjunction with the drawings.

FIG. 1 shows a first embodiment of an interlinked production system according to the present invention.

FIG. 2 shows a schematic illustration of a conventional automated cell which can be used as a buffer in the production system of FIG. 1.

FIG. 3 shows a schematic illustration of an automated cell which is preferably be used in the production system of FIG. 1.

FIG. 5 shows a schematic side view of the automated cell of FIG. 4.

FIG. 6 shows a simplified illustration of the bulkhead of the automated cell of FIG. 3 in side view together with a side guide element for an associated roller cart.

FIG. 7 shows a plan view of the bulkhead of FIG. 6 with associated side guide means.

FIG. 8 shows a simplified illustration of a front view of the bulkhead of FIG. 6 with associated cart and associated hood.

FIG. 9 shows a simplified illustration of a partial view of the hood from the side.

FIG. 1 shows a schematic illustration of an interlinked production system according to the present invention which is indicated by the numeral 10.

Figure 4:
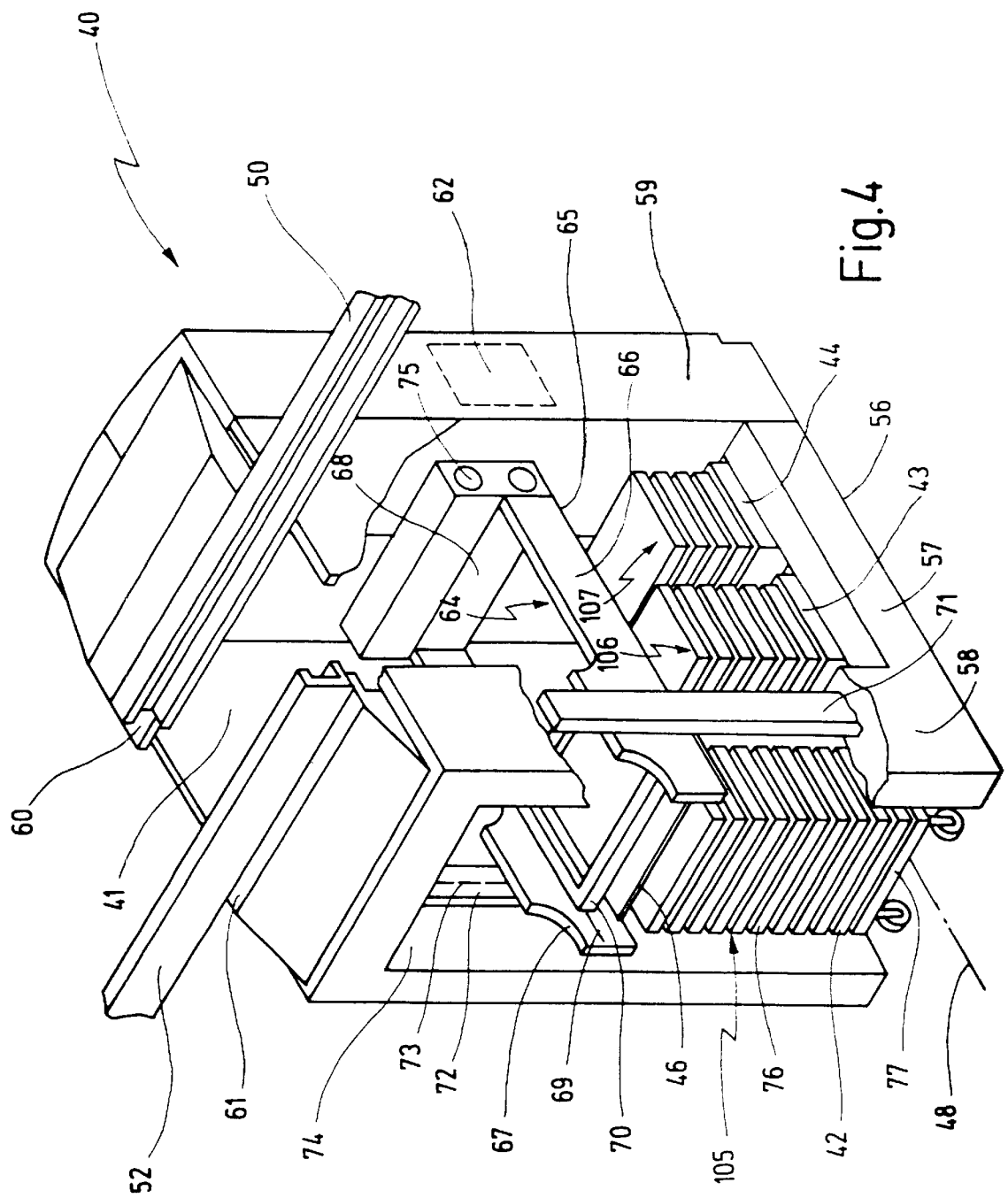
FIG. 4 shows a partial cut-away, perspective view of an automated cell according to FIG. 3, where a number of parts have been removed for better illustration, for example the front door.

The production system 10 comprises a total of six processing stations 12, 13, 14, 15, 16, 17 as well as four associated buffers 23, 24, 25, 26 and five associated portals 18, 19, 20, 21, 22.

The illustrated system 10 is only a section of a larger production system 10 having a larger number of processing stations and associated buffers. For example, there could be 10 to 30 processing stations with a correspondingly adapted number of buffers.

According to FIG. 1, a first buffer 23 communicates with a first processing station 12 via a portal 18 and with two adjacent processing stations 13, 14 via the portal 13 and with a further buffer 24. The buffer 24 is coupled additionally to the processing station 15 via the portal 20 and with a further buffer 25. The buffer 25 communicates with two adjacent processing stations 16, 17 via the portal 21 and with the buffer 26. The buffer 26 is in turn connected to the subsequent stations of the production system 10 via a further portal 22.

Parts pass through the production system 10 in the flow direction 11, where these parts are subjected to sequential processing steps in the individual processing stations 12 to 17. The individual stations, for example the stations 13 and 14 as well as 16 and 17 can perform the same processing steps to allow a parallel processing of workpieces and thus an increased throughput at a slower station or to ensure an improved reliability against failure of a station.

In the production system illustrated in FIG. 1, the flow of parts through the system 10 takes place through the two portals 18, 19 or 19, 20 or 20, 21 or 21, 22, which each have a buffer 23, 24, 25 or 26 associated therewith. Basically however, it is also possible to use only a single portal to interconnect all of the processing stations and buffers.

At least one portal gripper is arranged on each portal 18 to 22 on a carriage drivable in longitudinal direction of the portal, as indicated by the arrow 27, and controllably driven in vertical direction. This allows parts to be removed from the buffers 23 to 26, to be placed in the buffers and to transfer the parts to processing stations 12 to 17 or to return same. In addition, stacks of part carriers can be supplied and discharged to the buffers 23, 24, 25, 26 from the side, as is indicated by the arrow 28.

All of the components of the interlinked production system 10 are decentrally controlled and therefore autonomous. However, the components for communicating information are coupled to a central system control and information system 29 (main control), which can take place through a bus system 30.

The buffers 23 to 26 can be configured as automated cells as is disclosed in EP 0 673 711 A1 or in EP 0 865 864 A1 and schematically illustrated in FIG. 2. The automated cell 32 in FIG. 2 comprises a closed working space 33 within which a stack position 35 and a further stack position 36 are arranged, between which a ready position 37 is provided. A stack exchange module 38 is additionally provided for supplying and discharging stacks of part carriers to the working space 33, the module having a loading space closed by doors to avoid contact to the outside. A bulkhead 39 is provided which is commonly rotated with a rotary frame upon which the stack position 35 and an opposite stack position 34 is arranged, and which is accessible from the outside through the doors. This arrangement allows the outer stack on the stack position 34 to be loaded or unloaded when the doors are open, while part carriers on the opposite stack position 35 within the working space 33 can be handled.

A one-arm pallet transfer device (not shown) is provided as transfer means within the working space 33, with which the part carriers can be stacked and unstacked between the stack positions 35, 36 and placed on top of the ready position 37. Here, the associated portal can remove parts from the part carrier with a portal gripper (not shown) or can place parts in this carrier. Alternatively, the pallet transfer device can also have a horizontal axis which is drivably mounted on a vertical guide in vertical direction.

The automated cell 40 of FIG. 3 comprises three stack positions 42, 43, 44 arranged sequentially in a first horizontal direction 48. The first stack position 42 is closed to the outside by a door 47 having two pivotal wings and is separated from the second stack position 43 by a stationary bulkhead 45. When opening the door 47, a closure free of contact with the remaining portion of the automated cell 40 is ensured by a hood 46, so that part carriers can be moved back and forth within the working space 41 between the two stack positions 43, 44, without the d anger of an accident when the door 47 is opened.

Two portals 50, 52 run above the automated cell 40, which are supported at the top of the automated cell 40. Portal grippers 51, 53 on the portals are drivable in the direction of the portals 50, 52 as indicated by the arrows 54, 55. Each of the grippers comprises a gripping device drivable in vertical direction for gripping parts.

A transfer device is provided with a linear axis drivable in horizontal direction and a linear axis drivable in vertical direction to transfer part carriers between the stack positions 42, 43, 44 within the working space 41 and for making the part carriers available for the grippers 51, 53, which is described in more detail below in conjunction with FIG. 4.

The configuration of the buffers 23 to 26 of the production system 10 in the form of an automated cell 40 leads to a number of advantages compared to a conventional line production with belt conveyors or compared to a coupling of individual processing stations via portals with associated belt buffers. Since each buffer 23 to 26 has at least two stack positions, preferably even three stacked positions 42 to 44 as in FIG. 3, a sufficient buffer capacity is ensured for the entire production system 10, where at the same time the disadvantages related to the direct handling of parts are avoided (danger of damage, amount of personnel, lack of transparency in the logistics).

In addition, the production system 10 can be operated in flexible manner as desired according to the particular demands or as required by certain capacity situations. In one type of operation, the production system is run in one piece flow to achieve a rapid throughput of parts through the entire system 10 with the shortest possible throughput times and with low part inventories. In this operation, the buffer function can either be relinquished or a limitation is made to a one part carrier.

In contrast, if a high productivity is desired, the buffers 23 to 26 can be adjusted to their optimal capacity, preferably with a computer simulation of the entire production system. The capacity is optimally adapted to the various cycle times of the participating processing stations and the breakdown sensitivity of the stations concerned. A certain minimal buffer capacity can be provided, which should always be maintained as far as possible or also a maximum buffer capacity which should not be exceeded as far as possible (adapted to the desired efficiency).

Using three stack positions within the automated cell 40 allows additional, flexible, alternative possibilities, without the necessity of a manual handling of the parts which could damage the workpieces. Moreover, at portions of the production system where bottlenecks occur, additional stacks of part carriers can be supplied or removed from the associated buffers 23 to 26 through outer lying transportation means as an emergency strategy. It is even possible to couple external processing stations into the part flow.

Thus, the production system 10 combines the advantages of a linear production with the advantages of automated cells, which allow a flexible buffer capacity and a flexible supply of stacks of workpiece carriers. Different strategies can be operated depending on the momentary requirements and the entire system can be changed among different strategies with little effort, for example from a one-piece-flow to an operation with optimised buffer capacities to achieve maximum productivity.

The information flow of the parts concerned can take place practically through the parts themselves throughout the entire system, which considerably simplifies the control of the production system 10 and ensures a transparent material flow. The buffers can be run continuously in FIFO operation or be updated at predetermined time intervals or by manual control, to avoid workpieces from remaining too long in a buffer by exchanging them with newly supplied parts.

The construction and function of the automated cell 40 will now be described in more detail in conjunction with FIGS. 4 to 9. The automated cell 40 in FIG. 4 comprises a stable U-shaped frame 56 with a central element 57, a front frame portion 58 to which the two wing doors are mounted and a back frame portion 59.

The frame 56 and the front and back frame portions 58, 59 are configured to be twist resistant, such that the automated cell 40 on the whole with the associated components secured to the frame 66 can be transported and assembled. Support surfaces 60, 61 are provided at the upper ends of the front frame portion 58 and the back frame portion 59, upon which the portals 50, 52 can be secured, which leads to a simplification of the total configuration.

Furthermore, a controller 62 is integrated into the back frame portion 59, by which the function of the automated cell 40 is program controlled. A transfer device indicated by the numeral 64 is provided within the working space 41, which allows transfer of part carriers 76 between stacks 105, 106, 107 of workpiece carriers placed at the stack positions 42, 43, 44. In addition, parts can be removed or deposited into a top part carrier 76 by means of grippers 51, 53 (not shown in FIG. 4) drivable along the portals 50, 52.

The transfer device 64 comprises a U-shaped frame 65 having a central portion 68 ending shortly before the back frame portion 59 and two horizontally disposed shanks 66, 67. At their front region, the two shanks 66, 67 are received to be drivable in vertical direction along a vertical guide 73 in two vertical supports 71, 72 integrated into the front frame portion 58. For this purpose, a suitable drive 74 with a chain or toothed belt is integrated into the front frame member 58. Horizontal guides 69 are provided on the two shanks 66, 67, on which a gripping device 70 is driven under control. For this purpose a motor 75 is mounted on the centre portion 68 of the frame 65 and is coupled with a suitable chain or toothed belt. The stack 105 of part carriers can be moved into or out of the first stack position 42 when the door is open, the stack being received on a roller cart 77 or a base frame.

As schematically illustrated in FIG. 5, a rapid work flow is ensured by an advantageous handling of the part carriers 76 by the single transfer device 64, by which the part carriers 76 can be transported between the stack positions 42, 43, 44 in horizontal direction 63. The work flow can be adapted to very short cycle times of the associated processing stations without causing delays. Simultaneously, a stack specific logistics is ensured practically without delays.

When first starting up operation, a stack of part carriers with fresh parts is driven into the first stack position 42. When the door 47 is open, the first stack position 42 is separated with respect to the second stack position 43 by the stationary bulkhead 45 and also by the U-shaped hood 46 located above the first stack position 42 when the door is open. Thus the first stack position is securely guarded against contact with the remaining portion of the automated cell 40.

After closing the loading door 47, the hood 46 is driven away from the first stack position 42, so that the part carriers 76 can now be transferred with the gripping device 70 from the first stacking position 42, for example to the second stack position 43, as indicated by the arrow 85. In this operation, several part carriers 76 can be moved at the same time. After restacking to the second stack position 43, the individual part carriers 76 can be transferred in series to the third stack position 44. By means of the gripper indicated by the numeral 51, drivable in the vertical direction, parts 82, 83 can be removed from or placed into the part carriers 76 with a double gripper 81 provided on the gripper.

Delays caused by restacking can be avoided in that not all parts of a part carrier are removed sequentially and transferred to the associated processing station, but at least one part is left and each part carrier 76 retains one fresh part.

When later restacking the part carriers from the third stack position 44 to the first stack position 42, the remaining fresh parts can then be used and exchanged by the double gripper 81 with finished parts from the processing station. The double gripper 81 is pivotally mounted on the gripper 51 as indicated by the arrow 84. The U-shaped frame 65 of the transfer device 64 as explained above, can be driven in vertical direction on the vertical supports 71, 72 as illustrated with the double arrow 86 in FIG. 5. The gripper 70 for grasping the part carriers 76 can be driven in horizontal direction on the U-shaped frame 65 as indicated by the double arrow 79.

The hood 46, which serves as a protection against contact, can be driven on a horizontal guide 96 between the stack locations 42, 43, 44. For this purpose, the transfer device can be used 64 for moving the hood 46 among these three positions. When the associated processing stations have very short cycle times, the hood 46 however can also be equipped with its own drive. For particularly short cycle times, the upper side of the hood 46 itself can be configured to receive a part carrier, as is indicated by numeral 76', when the hood is located at the position 46' over the third stack position 44.

This enables a decoupling of the transfer between the stack positions 42 and 43 from the supply or removal of parts from the uppermost part carrier at the third stack position 44. In addition, a telescopic drawer 120 can be provided on the top side of the hood 46 for receiving a part carrier 76', which allows the part carrier 76' to be driven outwardly in the arrow direction 122 when the loading door 47 is open (FIG. 9).

The bulkhead 45, shown in enlarged illustration in FIGS. 6 and 7, is preferably configured to be particularly stable, and as seen in the plan view in FIG. 7, is provided with centering surfaces 87, 88 at its outer ends. The stacks of part carriers, driven into the first stack position 42 on a roller cart 77, is centered by the two inclined centering surfaces 87, 88 and is aligned to the flat surface of the bulkhead 45.

In addition, guide elements 89, 90 are provided in the front region at both sides near the door, which can be movable as indicated by the arrows 91, 92 to allow a pre-centering of a stack of part carriers before introduction into the first stack position 42. This is appropriate for example for carriers with parts coming from a hardening plant.

A guide track, as indicated by the numeral 108 can also be arranged at both sides for receiving a stack of part carriers when introduced to the first stack position 42. The track is adjustable for alignment with respect to the floor surface by means of an adjustment element 102. Rollers 101 are provided on these two guide tracks 108 to receive the roller carts independent of the floor surface thereunder. A stack of part carriers can then be pushed onto the forward lower rollers of the guide tracks 108 and then with a thrusting movement be transferred onto the two guide tracks 108. The stacks of part carriers are then properly aligned by the centering surfaces 87, 88 on the bulkhead 45 independent of the floor surface and received at the first stack position 42. Thus a high accuracy in positioning for the later handling procedures is achieved.

In the enlarged illustration of FIG. 8, one recognises that the hood 46 is configured with an upper cover surface 93 and two side surfaces 94, 95, which can be driven along the horizontal guides 96 at their lower ends by means of a drive device 97.

To secure the hood 46 over the first stack position 42, the second stack position 43 or the third stack position 44, a shaft 98 can be provided at the side of the hood 46 as shown in FIG. 8. The shaft is rotatable about its longitudinal axis and has three locking pins 99 at suitable locations, which can be locked with recesses 100 on the hood 46 when the desired locking position has been reached.

In addition, the entire automated cell can be configured to be drip-proof so that the entrainment of cooling lubricant can be avoided. For this purpose, the entire region of the working space 41 is lined with a floor pan 109. At the same time, the loss of cooling lubricant in the region of the first stack position 42 can be avoided in that the floor pan 109 is extended beneath the guide 96 for the hood 46 as shown in FIG. 8. The configuration is such that a drop collecting surface 103 projects to extend over the edge 104 of the roller cart 77, so that the intermediate space toward the roller cart 77 is covered.

Figure 10:
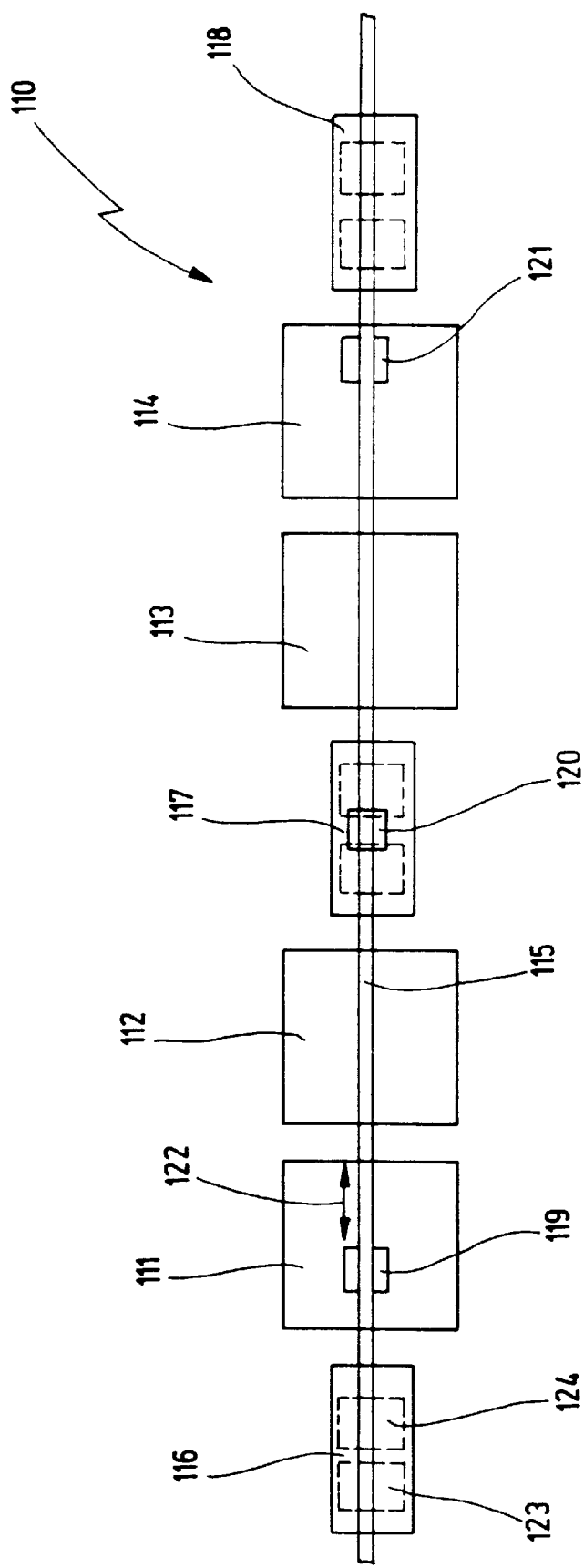
FIG. 10 shows a simplified illustration of a modified embodiment of the interlinked production system.

A modified embodiment of an interlinked production system is shown in FIG. 10 and indicated by the numeral 110. The embodiment is simplified compared to the embodiment of FIG. 1 and is less expensive in manufacture.

The production system 110 of FIG. 10 comprises a first buffer 116, two adjacent processing stations 111, 112, a further buffer 117, two further processing stations 113, 114 and a further buffer 118. It will be understood that further processing stations and buffers can follow. A single portal 115 serves to transport the parts or part carriers between the buffers 116 to 118 and the processing stations 111 to 114.

A suitable number of portal grippers 119, 120, 121 are provided on the portal 115, which can be driven along the portal and have an arm driven in vertical direction. A gripper is provided at the end of the arm, which is suited to grip the workpieces and also to grip the part carriers. In this case, the portal grippers 119, 120, 121 operate to load and unload parts into the processing stations 111 to 114 and also to transfer part carriers between the respective two neighbouring stack positions 123, 124 within the respective buffers 116 to 118.

What is claimed is:

1. An interlinked production system, comprising
   a plurality of processing stations for performing processing operations on parts;
   at least three buffers for decoupling the processing operations in the processing stations, each buffer being configured for receiving a plurality of part carriers and comprising at least two stack positions for receiving stacks of part carriers;
   at least one portal linking the processing stations and the buffer;
   at least one portal gripper being drivable along said portal to transport parts to be processed between the processing stations and the buffers, said portal gripper comprising gripping means for gripping parts to be transferred;
   wherein each buffer comprises a transfer device adapted for transferring part carriers between the stack positions within the buffers.

2. The production system of claim 1, wherein at least one of the transfer devices is formed by a portal gripper configured to grip the parts and also to grip part carriers for transferring within the buffers between the stack positions of the buffers, and wherein the stack positions are arranged sequentially along the portal in a direction along which the portal grippers may be driven.

3. The production system of claim 1, wherein at least one of the buffers is configured as an automated cell, having an independent transfer device for transferring part carriers between the stack positions within the automated cell.

4. The production system of claim 3, wherein the stack positions in said automated cell are arranged sequentially after one another and transversely to a direction in which said portal extends.

5. The production system of claim 3, wherein at least one of said buffers is configured as an automated cell, said automated cell comprising a working space, a transfer device for transferring part carriers between said stack positions within of the automated cell, and a device for supplying stacks of part carriers into the working space and for discharging stacks of part carriers and out of said working space.

6. The production system of claim 5, wherein said automated cell comprises three stack positions for receiving stacks of part carriers.

7. The production system of claim 1, wherein the buffers comprise a working space secured against contact from the outside.

8. The production system of claim 1, comprising at least two portals linking at least one of said buffers with at least one of said processing stations.

9. The production system of claim 5, wherein said automated cell comprises a working space surrounded by a wall and a door arranged within said wall, wherein first, second, and third stack positions are arranged sequentially in a horizontal direction within said working space, the first stack position allowing loading of part carriers through said door from the outside in said horizontal direction, wherein means is provided for separating said first stack position from said second stack position, a transfer device is provided extending in the direction of the sequentially arranged stack positions and allowing a transfer of parts between the three stack positions within the working space, and wherein the transfer device comprises a first linear axis and a second linear axis coupled to said first linear axis, said first linear axis being horizontally drivable, and said second linear axis being vertically drivable.

10. The production system of claim 9, further comprising bulkhead extending substantially vertically, said bulkhead separating said first stack position from said second stack position arranged adjacent therto.

11. The production system of claim 10, further comprising a hood, said hood being drivable at least between said first and second stack positions.

12. The production system of claim 11, wherein said bulkhead is configured to be stationary and comprises centering surfaces for guiding and centering part carriers supplied to the first stack position.

13. The production system of claim 11, wherein the hood is formed to be U-shaped and comprises a top surface extending substantially horizontally and two side surfaces extending substantially vertically.

14. The production system of claim 11, wherein the hood is arranged to be drivable between said first, second and third stack positions.

15. The production system of claim 14, wherein said transfer device comprises engaging means for said hood for driving said hood between said stack positions.

16. The production system of claim 15, further comprising a drive means coupled to said hood for positioning said hood above one of said first, second and third stack positions.

17. The production system of claim 13, wherein said top surface of said hood is configured to receive at least one part carrier.

18. The production system of claim 17, further comprising a drawer attached to said top surface of said hood, said drawer being configured for receiving a part carrier therein and being extendabe from said first stack position to the outside, when said door is open.

19. The production system of claim 14, further comprising locking means for locking said hood over one of said first, second and third stack positions.

* * * * *